(12) United States Patent
Perrins

(10) Patent No.: US 7,675,987 B2
(45) Date of Patent: Mar. 9, 2010

(54) TRELLIS-BASED LOCK DETECTOR

(75) Inventor: Erik S. Perrins, Lawrence, KS (US)

(73) Assignee: Quasonix. Inc., West Chester, OH (US)

( * ) Notice: Subject to any disclaimer, the term of this patent is extended or adjusted under 35 U.S.C. 154(b) by 690 days.

(21) Appl. No.: 11/534,899

(22) Filed: Sep. 25, 2006

(65) Prior Publication Data

US 2007/0071141 A1    Mar. 29, 2007

Related U.S. Application Data

(60) Provisional application No. 60/720,342, filed on Sep. 23, 2005.

(51) Int. Cl.
*H04L 5/12*    (2006.01)
*H04L 23/02*    (2006.01)

(52) U.S. Cl. ...................... 375/265; 714/792

(58) Field of Classification Search ................ 375/265, 375/262, 340–341; 714/792, 794, 796
See application file for complete search history.

(56) References Cited

U.S. PATENT DOCUMENTS

| | | | | |
|---|---|---|---|---|
| 5,432,820 A | * | 7/1995 | Sugawara et al. | 375/341 |
| 5,751,734 A | * | 5/1998 | Choi et al. | 714/792 |
| 5,991,914 A | * | 11/1999 | Honma | 714/794 |
| 5,995,562 A | * | 11/1999 | Koizumi | 375/341 |
| 6,356,586 B1 | * | 3/2002 | Krishnamoorthy et al. | 375/233 |
| 7,062,000 B1 | * | 6/2006 | Kishino | 375/341 |
| 2005/0117673 A1 | * | 6/2005 | Wu et al. | 375/341 |

* cited by examiner

*Primary Examiner*—Jean B Corrielus
(74) *Attorney, Agent, or Firm*—Tucker Ellis & West LLP

(57) ABSTRACT

A trellis-based lock detector and method for digitally modulated signals are presented. A global survivor for consecutive time indexes is computed as a maximum cumulative branch metric corresponding to a given time index for consecutive branches of the trellis structure. The invention is based on a concept that for a noise signal entering the lock detector, in contrast to an informative signal, the probability of a long succession of true evaluations of a global survivor is very small. The latter allows for using data, representative of the number of consecutive true conditions for a global survivor over an averaging time, as an informative parameter for making a decision on the status of lock detection.

16 Claims, 4 Drawing Sheets

TRELLIS-BASED LOCK DETECTOR

CROSS-REFERENCE TO RELATED APPLICATIONS

This application is based on and claims priority to provisional U.S. Provisional Patent Application Ser. No. 60/720,342, which was filed on Sep. 23, 2005.

BACKGROUND OF THE INVENTION

The subject application relates generally to lock detectors for digital communication systems. More particularly, this invention is directed to a lock detector having a trellis structure and a method for lock detection that provide indication of tracking a carrier signal. The trellis based lock detector and trellis-based method for lock detection of the present application are capable of being advantageously used in communication systems designed to convey signals employing any type of digital modulation, that are capable of being described by a trellis, such as, for example, and without limitation, pulse width modulation/frequency modulation (PCM/FM), Feher-patented quadrature-phase-shift keying (FQPSK), shaped offset quadrature-phase-shift keying (SOQPSK), and all forms of continuous phase modulation (CPM).

Previously known carrier lock detectors are typically implemented as phase lock loop detectors, delay-locked loop detectors, or signal power detectors. The performance of lock detectors of these types is dependant on the carrier signal amplitude. This being the case, at low levels of signal to noise ratio, previously known lock detectors may indicate an out-of-lock condition even though the carrier is still locked.

Also known in the art, are more advanced lock detectors that are signal amplitude independent. However lock detectors of this type exhibit high complexity.

Thus, there is a need for a carrier lock detector and method for carrier lock detection that overcome the above mentioned problems.

It would be desirable to have a carrier lock detector and method that are not dependant on the amplitude of the carrier signal.

Further, it is desirable to be able to reliably discriminate between a digitally modulated informative signal with a very poor signal to noise ratio, and no signal whatsoever.

It would be also desirable to have a carrier lock detector and method capable of providing reliable lock information even at very low signal to noise ratio, while simplifying hardware requirements.

SUMMARY OF THE INVENTION

In accordance with the subject application, there are provided a carrier lock detector and method for carrier lock detection that are not dependant on the amplitude of the carrier signal.

Further, in accordance with the subject application, there are provided a trellis-based lock detector and a trellis-based method for carrier lock detection that simplify hardware requirements.

Still further, in accordance with the present invention, there are provided a trellis lock detector and a trellis-based method for carrier lock detection capable of providing reliable lock information.

In accordance with one aspect of the present invention, there is provided a trellis-based lock detector including receiving means adapted for receiving an incoming signal and observation means adapted for performing multi-symbol observations on the received signal. The incoming signal is at least one of the following: a digitally modulated informative signal, and a noise signal. The trellis-based lock detector also includes cumulative means and memory means. The cumulative means is adapted for acquiring cumulative observation data by recursively computing observation data corresponding to multi-symbol observations. The memory means is adapted for storing cumulative observation data in a traceback matrix. The trellis-based lock detector further includes evaluating means and decision means. The evaluating means is adapted for evaluating the cumulative observation data stored in the traceback matrix. The decision means is adapted for making a decision on a status of the trellis-based lock detector based on the evaluation of acquired cumulative observation data. The decision is made by selecting from the group consisting of: a lock status, and unlock status.

In a preferred embodiment, the cumulative means is further adapted for recursively computing a global survivor for consecutive time indexes. The global survivor is suitably computed as a maximum cumulative branch metric corresponding to a given time index for consecutive branches of the trellis structure.

The evaluating means is, preferably, further adapted for backtracing a global survivor for a given time index to a previous time index. In this embodiment, the evaluating means is further adapted for determining a global survivor condition for the previous time index, the condition being selected from the group consisting of: a true condition, and a false condition.

In another preferred embodiment, the evaluating means is further adapted for recursively computing the number of consecutive true conditions for a global survivor over an averaging time. The evaluating means is also adapted for obtaining data representative of the number of consecutive true conditions for a global survivor over an averaging time. In this embodiment, the decision means is further adapted for selecting a status of the trellis-based lock detector by comparing the obtained data with at least one threshold data. Preferably, the observation means further includes and adjusting portion for adjusting a multi-symbol observation length.

In accordance with another aspect of the present invention, there is provided a trellis-based method for lock detection of a digitally modulated informative signal. According to the method, an incoming signal is received, wherein the incoming signal is at least one of the following: a digitally modulated informative signal, and a noise signal. Next, multi-symbol observations are performed on the received signal, and cumulative observation data is acquired by recursively computing observation data corresponding to the multi-symbol observations. Acquired cumulative observation data corresponding to the multi-symbol observations is then stored in a traceback matrix, and evaluated. Next, based on the evaluation of acquired cumulative observation data, a decision on a status of the digitally modulated informative signal is made by selecting from the group consisting of: a lock status, and unlock status.

In a preferred embodiment, the step of acquiring cumulative observation data further includes the step of recursively computing a global survivor for consecutive time indexes. The global survivor is recursively computed as a maximum cumulative branch metric corresponding to a given time index for consecutive branches of the trellis structure.

The step of evaluating, preferably, includes the step of backtracing a global survivor for a given time index to a previous time index. In this embodiment, the step of evaluating further includes the step of determining a global survivor condition for the previous time index. The condition for the previous time index is selected from the group consisting of: a true condition, and a false condition.

The step of evaluating, preferably, includes the step of recursively computing the number of consecutive true conditions for a global survivor over an averaging time, and obtaining data representative of the number of consecutive true conditions for a global survivor over an averaging time. In this embodiment, the step of making a decision further includes the step of comparing the obtained data with at least one threshold data, selecting thereby the status of the digitally modulated informative signal.

Thus, the design of the trellis-based lock detector and the trellis-based method for lock detection of a digitally modulated informative signal of the subject invention are based on a concept that for a noise signal entering the receiving means, the probability of a long succession of true evaluations of a global survivor is very small. In contrast, an informative signal present at the input of the receiving means, results in the global survivor following a consistent path for consecutive time indexes. The latter allows for using data, representative of the number of consecutive true conditions for a global survivor over an averaging time, as an informative parameter for making a decision on the status of lock detection. Still other objects and aspects of the present invention will become readily apparent to those skilled in this art from the following description wherein there is shown and described a preferred embodiment of this invention, simply by way of illustration of one of the best modes suited for to carry out the invention. As it will be realized by those skilled in the art, the invention is capable of other different embodiments and its several details are capable of modifications in various obvious aspects all without departing from the invention. Accordingly, the drawings and description will be regarded as illustrative in nature and not as restrictive.

BRIEF DESCRIPTION OF THE DRAWINGS

The subject invention is described in connection with the attached drawings which are for the purpose of illustrating the preferred embodiment only, and not for the purpose of limiting the same, wherein.

DETAILED DESCRIPTION OF THE PREFERRED EMBODIMENT

The subject application is directed to lock detectors for digital communication systems. More particularly, the subject application is directed to a lock detector suitable for signals having a trellis structure and a trellis-based method for lock detection that provide indication of tracking a carrier signal. It will become apparent to those skilled in the art that the trellis-based lock detector and the trellis-based method for lock detection of the present application are capable of being advantageously used in communication systems designed to convey signals employing any type of digital modulation which can be described by a trellis structure, such as, for example, and without limitation, pulse width modulation/ frequency modulation (PCM/FM), Feher-patented quadrature-phase-shift keying (FQPSK), shaped offset quadrature-phase-shift keying (SOQPSK), and all forms of continuous phase modulation (CPM).

Figure 1:
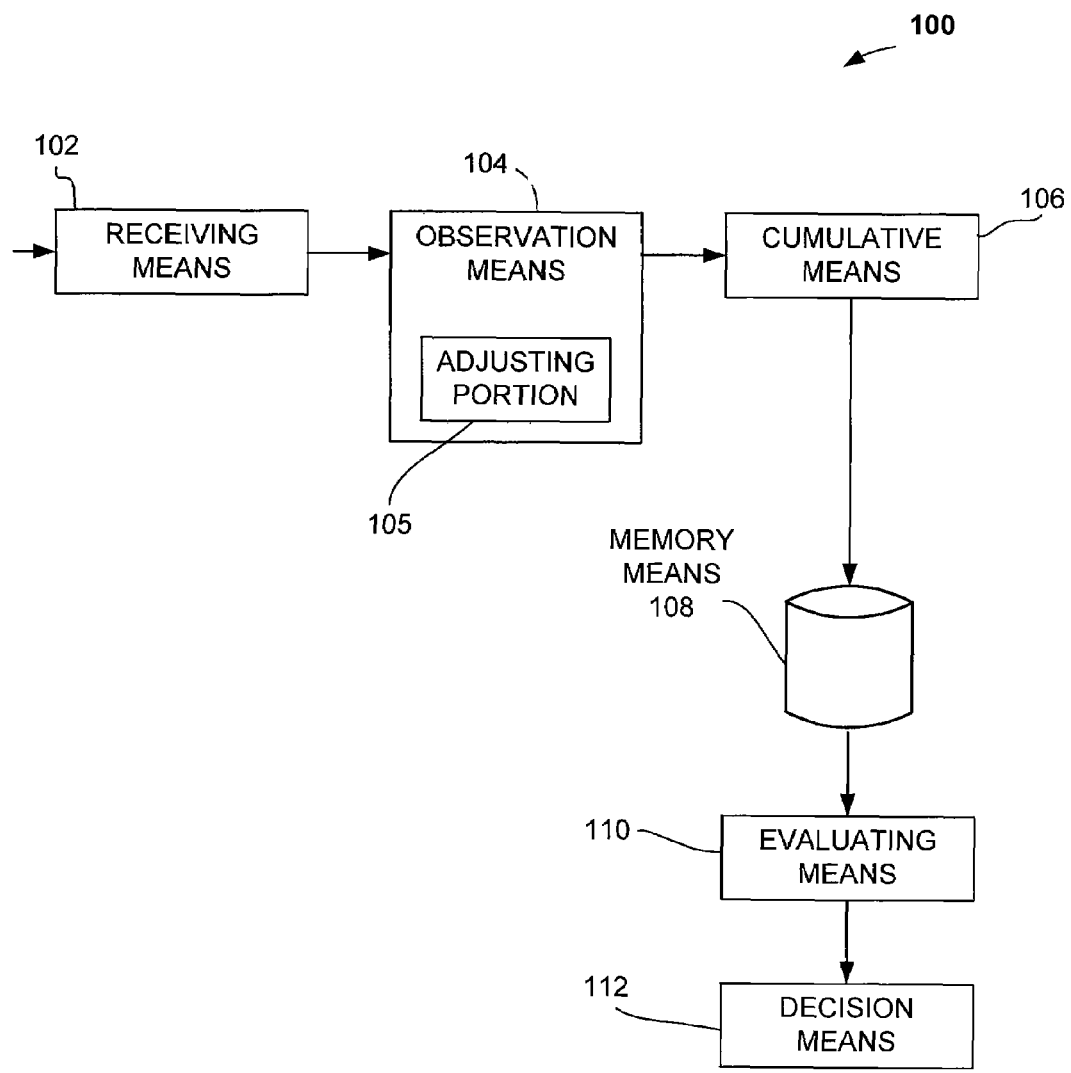
FIG. 1 is a block diagram of one preferred embodiment of the trellis-based lock detector in accordance with the subject application.
Figure 2:
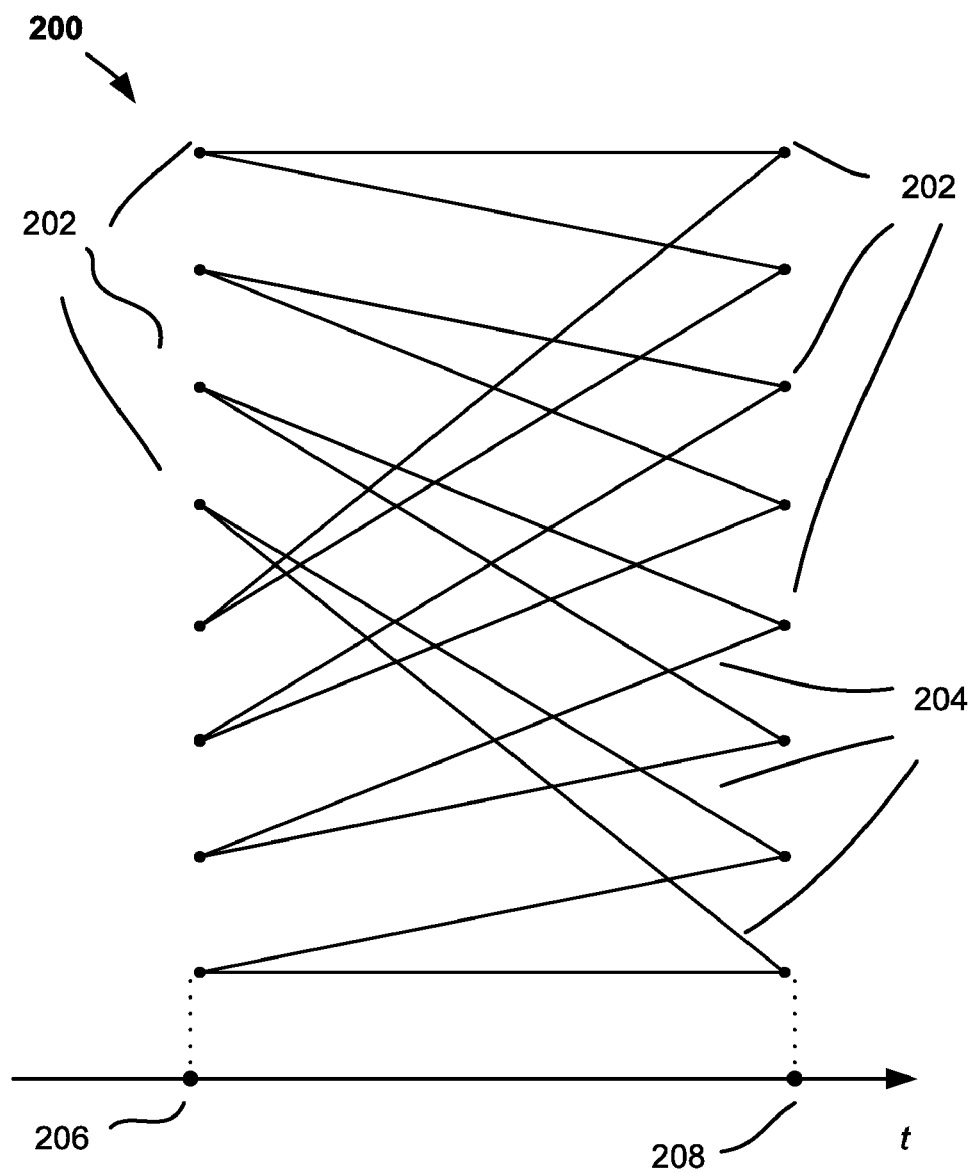
FIG. 2 is a diagram illustrating one section of an 8-state trellis in accordance with the subject application.

Turning now to FIG. 1, there is shown a block diagram of an embodiment of a trellis-based lock detector 100. As shown in FIG. 1, the trellis-based lock detector 100 includes receiving means 102 and observation means 104. The receiving means 102 is adapted for receiving an incoming signal, the incoming signal being at least one of the following: a digitally modulated informative signal, and a noise signal. Those skilled in the art will recognize, that the receiving means 102 is capable of being implemented as any suitable receiver known in the art suitably adapted for receiving digitally modulated signals. The observation means 104 is adapted for performing multi-symbol observations on received digitally modulated signals. The observation means 104 is suitably employed as part of a maximum likelihood sequence estimation device having a trellis structure. For illustration purposes, one section of an 8-state trellis structure 200 placed along a time axis t is shown in FIG. 2. The states 202 from one time index to the next time index are connected with branches 204. Each branch has a starting time index 206 and an ending time index 208. A skilled artisan will also recognize that for the purpose of this invention the observation means 104 is capable of further including an adjusting portion 105 for adjusting a multi-symbol observation length.

Referring now to FIG. 1, the trellis-based lock detector 100 also includes cumulative means 106 and memory means 108. The cumulative means 106 is adapted for acquiring cumulative observation data by recursively computing observation data corresponding to multi-symbol observations. The cumulative means 106 is further adapted for recursively computing a global survivor for consecutive time indexes. Those skilled in the art will appreciate that the global survivor is suitably recursively computed as a maximum cumulative branch metric corresponding to a given time index for consecutive branches of the trellis structure. Those skilled in the art will further recognize that the cumulative means 106 is capable of being employed as any computing means known in the art adapted for computing branch metric, such as add-compare-select means, well known in the art. Preferably, the cumulative means 106 is part of a maximum likelihood sequence estimation device having a trellis structure, such as illustrated in FIG. 2. The memory means 108 is adapted for storing cumulative observation data. Those skilled in the art will recognize that suitable memory means includes volatile memory, non-volatile memory, flash memory, optical memory, or the like, or any combination thereof.

The trellis-based lock detector 100 further includes evaluating means 110 and decision means 112. The evaluating means 110 is adapted for evaluating the stored cumulative observation data. The evaluating means 110 is further adapted for backtracing a global survivor for a given time index to a previous time index. The evaluating means 110 is further adapted for determining a global survivor condition for the previous time index. As will be appreciated by those skilled in the art, the condition is selected from the group consisting of: a true condition, and a false condition. The evaluating means 110 is suitably adapted for recursively computing the number of consecutive true conditions for a global survivor over an averaging time.

The decision means 112 is adapted for making a decision on a status of the trellis-based lock detector 100 based on the evaluation of acquired cumulative observation data. As will be recognized by a skilled artisan, the decision means 112 is further adapted for selecting a status of the trellis-based lock detector 100 by comparing the computed number of consecutive true conditions over the averaging time with at least one threshold data. The decision is made by selecting from the group consisting of: a lock status, and unlock status. Those skilled in the art will appreciate, that the evaluating means 110 and decision means 112 are capable of advantageously being part of a maximum likelihood sequence estimation device having a trellis structure, such as illustrated in FIG. 2. Those skilled in the art will also recognize, that the operation of the lock detector 100 of the present invention utilizes trellis-based detection techniques known as the Viterbi Algorithm.

Referring now to operation of the trellis-based lock detector 100 illustrated in FIG. 1, the operation commences by the receiving means 102 receiving an incoming signal, the incoming signal being at least one of the following: a digitally modulated informative signal, and a noise signal. As will be appreciated by those skilled in the art, the carrier of the digitally modulated signal is any transmissible carrier such as an electrical, electromagnetic, or optical signal conveyed by electrical or optical cable, or by radio or other means. As mentioned above, the type of digital modulation is capable of being, for example, but without limitation, pulse width modulation/frequency modulation (PCM/FM), Feher-patented quadrature-phase-shift keying (FQPSK), shaped offset quadrature-phase-shift keying (SOQPSK), and all forms of continuous phase modulation (CPM). Multi-symbol observations are performed on the received signal by the observation means 104.

Figure 3:
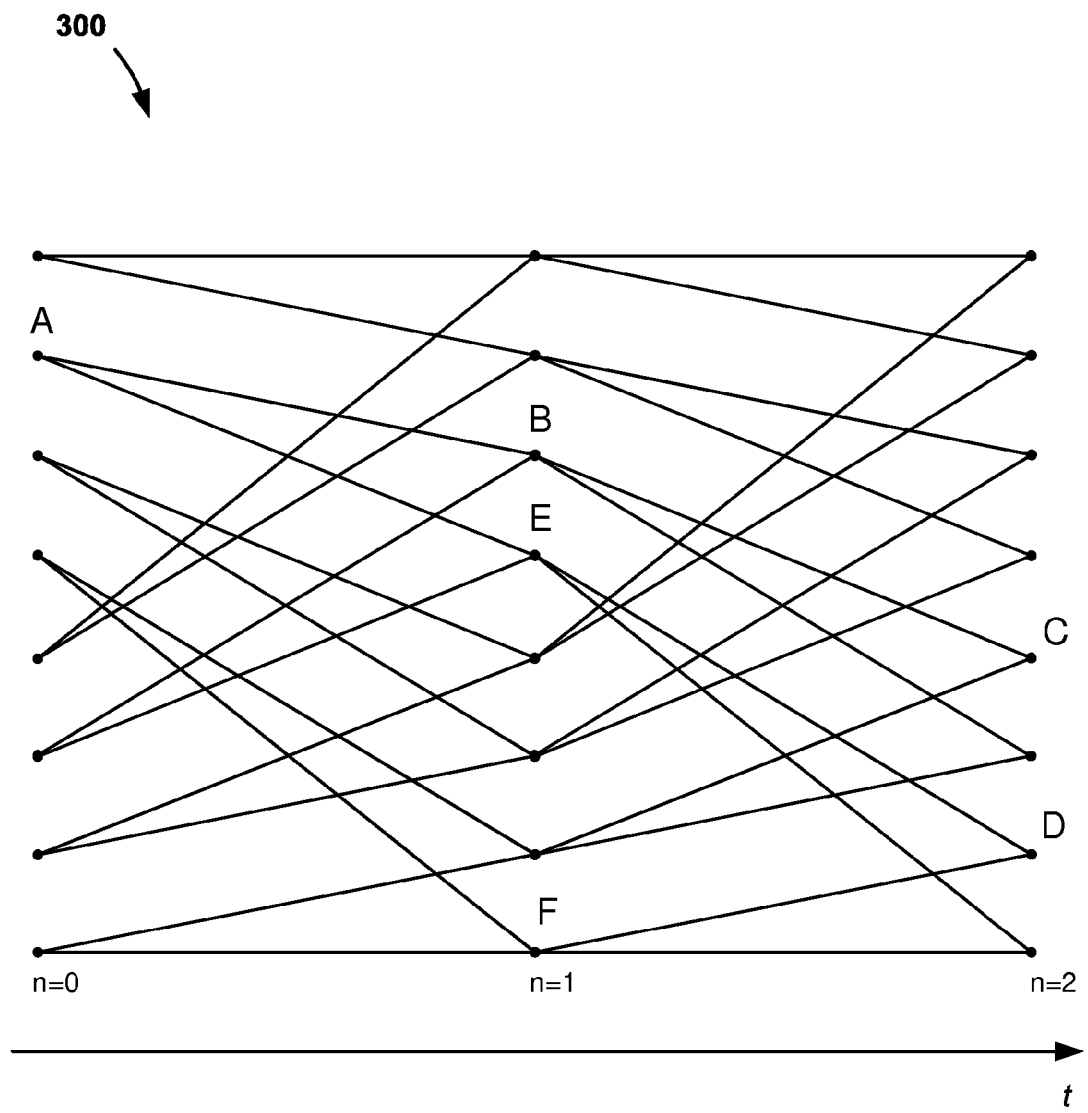
FIG. 3 is a diagram illustrating the test condition for a global survivor in accordance with the subject application.

Next, cumulative observation data is acquired by cumulative means 106. The cumulative means 106 recursively computes observation data corresponding to the multi-symbol observations. In other words, the cumulative means 106 computes a branch metric for each branch in the trellis structure. In accordance with the present application, the cumulative means 106 computes a global survivor for consecutive time indexes. Those skilled in the art will appreciate that the global survivor is suitably recursively computed by the cumulative means 106 as a maximum cumulative branch metric corresponding to a given time index for consecutive branches of the trellis structure. Acquired cumulative observation data corresponding to the multi-symbol observations is then stored in a traceback matrix in the memory means 108. For illustration purposes, an exemplary traceback matrix 300 placed along a time axis t is shown in FIG. 3. In FIGS. 3, A, B, and C are the global survivors GSn-2 GSn-1, and GSn, for time indexes: n=0, n=1, and n=2, respectively.

The cumulative observation data stored in the traceback matrix, is then evaluated by the evaluating means 110. The procedure of evaluating provided by the evaluation means 110 includes backtracing a global survivor for a given time index to a previous time index. The procedure of evaluating provided by the evaluation means 110 further includes determining a global survivor condition for the previous time index. As will be appreciated by those skilled in the art, the condition is selected from the group consisting of: a true condition, and a false condition. The procedure of determining a global survivor condition will be explained with reference to FIG. 3. In accordance with the present invention, the evaluating means 110 backtraces the following condition:

$$\text{Traceback}[n][GS_n] == GS_{n-1}. \quad (1)$$

As will be appreciated by those skilled in the art, the evaluating means 110 determines whether or not the global survivor at time index n can trace back to the previous global survivor. FIG. 3 gives examples of the two possible outcomes (true or false) for the condition in (1). As mentioned above, A, B, and C are the global survivors for n=0, n=1, and n=2, respectively (i.e. GSn-2, GSn-1, and GSn). In this instance the value stored in Traceback[2][C] is B, and since B is GSn-1 the condition in (1) evaluates to true. Now instead, suppose D is the global survivor for n=2 (GSn). In this case, the value stored in Traceback[2][D] can only be E or F; therefore, the condition in (1) evaluates to false, since neither E or F are GSn-1.

The motivation behind this condition is the following. If no digitally modulated signal is present at the input of the receiving means 102, then the trellis-based lock detector 100 is just tracking a noise signal. When a noise signal is tracked, the global survivor will hop to a different "lineage" frequently; therefore, the probability of a long succession of true evaluations of (1) (i.e. a long "streak") is very small. On the other hand, when the global survivors follow a consistent path over time (a long streak), this implies that a meaningful informative signal is present at the input of the receiving means 102.

Thus, the evaluating means 110 advantageously recursively compute the number of consecutive true conditions for a global survivor over an averaging time. Next, the decision means 112 makes a decision on a status of the trellis-based lock detector 100 based on the evaluation of acquired cumulative observation data. As will be recognized by a skilled artisan, the decision means 112 selects a status of the trellis-based lock detector 100 by comparing the computed number of consecutive true conditions for a global survivor over an averaging time with at least one threshold data. The decision is made by selecting from the group consisting of: a lock status, and unlock status.

Those skilled in the art will appreciate that the trellis-based lock detector of the present invention is capable of using, for example and without limitation, the following averaging algorithm:

```
Parameters:
Len = length of averaging buffer;
LockThresh = threshold to declare trellis lock;
UnlockThresh = threshold to declare trellis unlock;
Initializations:
Sum = 0;
CurStreak = 0;
StreakBuffer = 1×Len array of zeros;
LockStatus = false;
At each time step n, do the following:
// Maintain a running count of the number of times
// in a row the condition in (1) is true
IF[Condition (1) is true]
    CurStreak = CurStreak + 1;
ELSE
    CurStreak = 0;
END
// Find the average value of CurStreak by summing
// a number of recent values
Sum = Sum + CurStreak − StreakBuffer[n modulo Len];
StreakBuffer[n modulo Len] = CurStreak;
// Declare Lock if this average is over a certain threshold
IF[Sum > LockThresh]
    LockStatus = true;
END
// Declare Unlock if this average is below a certain threshold
IF[Sum < UnlockThresh]
    LockStatus = false;
END
Typical Parameter Values:
Len = 512;
LockThresh = 2*Len = 1024;
UnlockThresh = 1*Len = 512;
```

The values in the above example mean that 512 recent values of the streak are being averaged. The streak needs to be an average of 2 to declare a lock status, and if it falls below 1, an unlock status is declared.

Those skilled in the art will recognize, that although the subject invention is capable of being implemented using just one threshold data for making a decision, preferably, two separate thresholds are used for indication of a lock status, and of an unlock status. The latter prevents the detector from erroneous detection when the signal quality is marginal.

Figure 4:
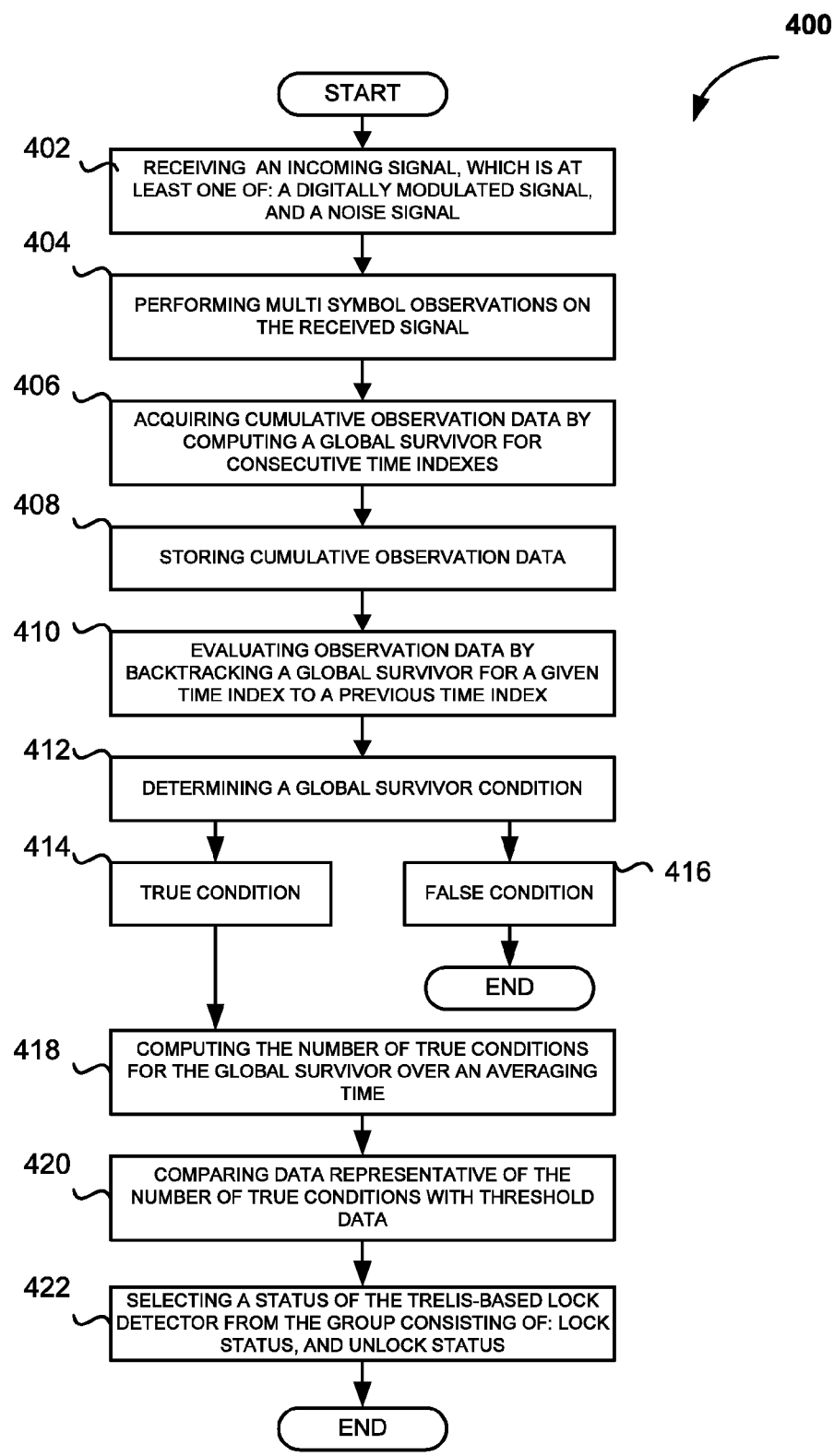
FIG. 4 is a flowchart illustrating a trellis-based method for lock detection according to the subject application.

As will be further appreciated by a skilled artisan, the proposed algorithm has extremely low complexity; it requires only simple add-compare-select operations and some memory. The performance of the trellis-based lock detector of the invention does not depend on received signal levels, automatic gain control settings, and the like, and provides reliable discrimination between a carrier with a very poor signal to noise ratio, and no signal whatsoever. The foregoing device 100 illustrated in FIG. 1, will better be understood when viewed in conjunction with the methodologies set forth in FIG. 4. Turning now to FIG. 4, there is shown a flowchart 400 illustrating a trellis-based method for carrier lock detection according to the subject application. Beginning at step 402, the process of lock detection commences by receiving an incoming signal with the aid of the receiving means 102. As previously mentioned, the incoming signal is at least one of the following: a digitally modulated informative signal, and a noise signal. As will be appreciated by those skilled in the art, the carrier of the digitally modulated signal is any transmissible carrier such as an electrical, electromagnetic, or optical signal conveyed by electrical or optical cable, or by radio or other means. As mentioned above, the type of digital modulation is capable of being, for example, but without limitation, pulse width modulation/frequency modulation (PCM/FM), Feher-patented quadrature-phase-shift keying (FQPSK), and all forms of continuous phase modulation (CPM).

Flow then proceeds to step 404, at which multi-symbol observations are performed on the received signal with the aid of the observation means 104. At step 406 cumulative observation data is acquired with the aid of cumulative means 106. At this step, the cumulative means 106 computes a global survivor for consecutive time indexes. Those skilled in the art will appreciate that the global survivor is suitably recursively computed with the aid of the cumulative means 106 as a maximum cumulative branch metric corresponding to a given time index for consecutive branches of the trellis structure.

At step 408, acquired cumulative observation data corresponding to the multi-symbol observations is stored in a traceback matrix with the aid of the memory means 108. Flow then proceeds to step 410, at which the cumulative observation data stored in the traceback matrix, is then evaluated with the aid of the evaluating means 110 by backtracing a global survivor for a given time index to a previous time index. At step 412 a global survivor condition for the previous time index is determined with the aid of the evaluating means 110. As will be appreciated by those skilled in the art, the condition is selected with the aid of the evaluating means 110 from the group consisting of: a true condition at step 414, and a false condition at step 416. If a false condition is selected at step 416, the procedure terminates. If a true condition is selected at step 414, flow then proceeds to step 418, at which the number of consecutive true conditions for a global survivor over an averaging time is computed with the aid of the evaluating means 110. Next, flow proceed to step 420, at which data representative of the number of consecutive true conditions for a global survivor over an averaging time is compared with at least one threshold data with the aid of the decision means 112. The procedure ends at step 422 by selecting a status of the trellis-based lock detector 100 with the aid of the decision means 112. The status is selected from the group consisting of: a lock status, and unlock status.

The invention extends to computer programs in the form of source code, object code, partially compiled or otherwise, and code intermediate sources, or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A trellis-based lock detector comprising:
   receiving means adapted for receiving an incoming signal, the incoming signal being at least one of the following: a digitally modulated informative signal, and a noise signal;
   observation means adapted for performing multi-symbol observations on the received signal;
   cumulative means adapted for acquiring cumulative observation data by recursively computing observation data corresponding to multi-symbol observations performed by the observation means;
   memory means adapted for storing cumulative observation data corresponding to multi-symbol observations performed by the observation means, in a traceback; and,
   a maximum likelihood sequence estimation device including an evaluating portion adapted for evaluating the cumulative observation data stored in the traceback matrix; and a decision portion adapted for making a decision on a status of the trellis-based lock detector by selecting from the group consisting of: a lock status, and unlock status, based on the evaluation of acquired cumulative observation data.

2. The trellis-based lock detector of claim 1 wherein the cumulative means is further adapted for recursively computing a global survivor for consecutive time indexes as a maximum cumulative branch metric corresponding to a given time index for consecutive branches of a trellis structure.

3. The trellis-based lock detector of claim 2 wherein the evaluating portion is further adapted for backtracing a global survivor for a given time index to a previous time index, and wherein the evaluating means is further adapted for determining a global survivor condition for the previous time index, the condition being selected from the group consisting of: a true condition, and a false condition.

4. The trellis-based lock detector of claim 3 wherein the evaluating portion is further adapted for:
recursively computing a number of consecutive true conditions for a global survivor over an averaging time, and
obtaining data representative of the number of consecutive true conditions for a global survivor over a preselected time period.

5. The trellis-based lock detector of claim 4 wherein the decision portion is further adapted for comparing data, representative of the number of consecutive true conditions for a global survivor over the preselected time period, with at least one threshold data, selecting thereby the status of the trellis-based lock detector based on a magnitude relation between data, representative of the number of consecutive true conditions for a global survivor over the preselected time period, and the at least one threshold data.

6. The trellis-based lock detector of claim 1 wherein the observation means further includes an adjusting portion for adjusting a multi-symbol observation length.

7. A trellis-based method in a communication system for lock detection of a digitally modulated informative signal, the method comprising:
receiving by a receiver of the communication system an incoming signal, the incoming signal being at least one of the following: a digitally modulated informative signal, and a noise signal;
performing, by a maximum likelihood sequence estimation device of the communication system, multi-symbol observations on the received signal;
acquiring, by a computing portion of the communication system, cumulative observation data by recursively computing observation data corresponding to the multi-symbol observations;
storing in a memory of the communication system cumulative observation data corresponding to the multi-symbol observations;
evaluating, by the maximum likelihood sequence estimation device of the communication system, acquired cumulative observation data; and
making a decision, by the maximum likelihood sequence estimation device of the communication system, on a status of the digitally modulated informative signal by selecting from the group consisting of: a lock status, and unlock status, based on the evaluation of acquired cumulative observation data.

8. A trellis-based method for lock detection of a digitally modulated informative signal of claim 7 wherein the step of acquiring cumulative observation data further comprises the step of recursively computing a global survivor for consecutive time indexes as a maximum cumulative branch metric corresponding to a given time index for consecutive branches of a trellis structure.

9. A trellis-based method for lock detection of a digitally modulated informative signal of claim 8 wherein the step of evaluating further comprises the steps of:
backtracing a global survivor for a given time index to a previous time index; and
determining a global survivor condition for the previous time index, the condition being selected from the group consisting of: a true condition, and a false condition.

10. A trellis-based method for lock detection of a digitally modulated informative signal of claim 9 wherein the step of evaluating further comprises the steps of:
recursively computing a number of consecutive true conditions for a global survivor over an averaging time; and
obtaining data representative of the number of consecutive true conditions for a global survivor over a preselected time period.

11. A trellis-based method for lock detection of a digitally modulated informative signal of claim 10 wherein the step of making a decision further comprises the step of comparing the obtained data with at least one threshold data, selecting thereby the status of the digitally modulated informative signal based on a magnitude relation between data, representative of the number of consecutive true conditions for a global survivor over the preselected time period, and the at least one threshold data.

12. A trellis-based method implemented in a computer for carrier lock detection of a digitally modulated informative signal, the method comprising:
performing, by an estimation device of the computer, multi-symbol observations on data representative of an incoming signal, the incoming signal being at least one of the following: a digitally modulated informative signal, and a noise signal;
acquiring by a computing portion of the computer cumulative observation data by recursively computing observation data corresponding to the multi-symbol observations;
storing in a memory of the computer cumulative observation data corresponding to the multi-symbol observations;
evaluating by the estimation device of the computer acquired cumulative observation data; and
making a decision by the estimation device of the computer on a status of the digitally modulated informative signal by selecting from the group consisting of: a lock status, and unlock status, based on the evaluation of acquired cumulative observation data.

13. A computer implemented trellis-based method for lock detection of a digitally modulated informative signal of claim 12 wherein the step of acquiring cumulative observation data further comprises the step of recursively computing a global survivor for consecutive time indexes as a maximum cumulative branch metric corresponding to a given time index for consecutive branches of a trellis structure.

14. A computer implemented trellis-based method for lock detection of a digitally modulated informative signal of claim 13 wherein the step of evaluating further comprises the steps of:
backtracing a global survivor for a given time index to a previous time index; and
determining a global survivor condition for the previous time index, the condition being selected from the group consisting of: a true condition, and a false condition.

15. A computer implemented trellis-based method for lock detection of a digitally modulated informative signal of claim 14 wherein the step of evaluating further comprises the steps of:
recursively computing a number of consecutive true conditions for a global survivor over an averaging time; and
obtaining data representative of the number of consecutive true conditions for a global survivor over a preselected time period.

16. A computer implemented trellis-based method for lock detection of a digitally modulated informative signal of claim 15 wherein the step of making a decision further comprises the step of comparing the obtained data with at least one threshold data, selecting thereby the status of the digitally modulated informative signal based on a magnitude relation between data, representative of the number of consecutive true conditions for a global survivor over the preselected time period, and the at least one threshold data.

* * * * *